United States Patent [19]

Zacharias

[11] 4,310,647

[45] Jan. 12, 1982

[54] HALOGENATED DICYCLOPENTADIENYL FUMARATES

[75] Inventor: George Zacharias, Alvin, Tex.

[73] Assignee: The Dow Chemical Company, Midland, Mich.

[21] Appl. No.: 135,027

[22] Filed: Mar. 28, 1980

[51] Int. Cl.$^3$ ............................................. C08L 63/00
[52] U.S. Cl. ..................................... 525/530; 525/531; 526/282; 560/194
[58] Field of Search ................................ 525/531, 530

[56] References Cited

U.S. PATENT DOCUMENTS

| | | | |
|---|---|---|---|
| 3,632,861 | 1/1972 | Hargis | 260/837 R |
| 4,117,030 | 9/1978 | Nelson | 525/531 |
| 4,141,868 | 2/1979 | Emmons | 526/283 |
| 4,145,503 | 3/1979 | Emmons | 525/531 |
| 4,261,872 | 4/1981 | Emmons | 525/531 |

FOREIGN PATENT DOCUMENTS 1195902  6/1970  United Kingdom .

*Primary Examiner*—Paul Lieberman

[57] ABSTRACT

Monoesters of fumaric acid and dicyclopentadienyl alcohol halogenated with one or two atoms of a halogen are compounds useful as reactive diluents for polyesters or vinyl ester resins.

3 Claims, No Drawings

HALOGENATED DICYCLOPENTADIENYL FUMARATES

BACKGROUND OF THE INVENTION

Extremely reactive unsaturated polyesters containing a high amount of halogen have been developed utilizing dicyclopentadiene or the corresponding alcohol, maleic anhydride and epoxy resins, preferably halogenated epoxy resins. Such polyesters possess poor cure characteristics when catalyzed alone. Polyesters of this type have been disclosed in Japanese Pat. Pub. No. 45-27474.

It would be desirable to have a material that had the reactivity of those polyesters but having good cure characteristics when catalyzed by itself.

SUMMARY OF THE INVENTION

Dicyclopentadienyl monoesters and diesters of fumaric acid wherein the dicyclopentadienyl group contains one or two halogen substituents are new polymerizable compounds which are especially well suited as reactive diluents to be used with curable resins, such as vinyl ester resins or unsaturated polyesters. The esters can be prepared by the novel process by esterifying maleic acid and causing isomerization to the fumaric equivalent during halogenation.

DETAILED DESCRIPTION OF THE INVENTION

The novel esters of this invention are the result of a two-step preparation involving a first preparation of a monoester or diester followed by a concurrent isomerization and halogenation.

The monoester is prepared by reacting about two equivalent amounts of maleic anhydride and one equivalent amount of 8-hydroxytricyclo[5,2,1,0$^{2,6}$]-4-decene (hereinafter called "dicyclopentadienyl alcohol") at elevated temperature for a time until substantial completion of the esterification. Generally, temperatures of from about 100° to about 200° C. are most useful to provide practical reaction times of about four to six hours. The diester results from the use of the anhydride and alcohol in equivalent amounts or a slight excess of alcohol.

It is necessary that a free radical polymerization inhibitor be utilized during the esterification step to prevent premature polymerization of the unsaturated materials. Such inhibitors are known and include typically hydroquinone, the methyl ether of hydroquinone, phenothiazine and other such compounds. The inhibitors are included in minor amounts as is well known in the art.

In the second step of the reaction sequence the half ester or diester is taken up in a solvent such as ethylene dichloride. To that solution is added slowly stoichiometric amounts of a halogen corresponding to the one unsaturated site in the cyclopentene portion of the molecule. External cooling should be applied during the halogen addition to maintain the reaction temperature below about 30° C. During the halogenation, the maleate moiety isomerizes to the fumarate structure. The fumarate half ester or diester can then be isolated from the solvent by known procedures.

The so-formed esters are adapted for use in a variety of applications. The half ester has both olefinic unsaturation and carboxyl functionality. Thus, the half ester can be homo- or copolymerized under chemical, thermal, photo or radiation catalytic inducement.

The carboxyl group of the monoester can be reacted in any of the reactions in which that function is known to react. Salt formation and esterification are typical of such reactions. The monoester can be used as all or part of the monoacid employed in preparing the class of resins known as vinyl ester resins. Those resins are the esterification product of a polyepoxide and a monocarboxylic monounsaturated acid. The diacrylate of the diglycidyl ether of bisphenol A is typical.

The monoesters and diesters can be homopolymerized or copolymerized to form useful resinous products. The polymerization occurs through the olefinic unsaturation and can be induced by known means such as chemical, thermal, photo- or ionizing radiation catalysis.

The esters may also be employed as functional components of compositions prepared from vinyl ester resins or unsaturated polyesters.

Vinyl ester resins are a class of resins having terminal unsaturation and are prepared by reacting an unsaturated monocarboxylic acid with a polyepoxide in about equivalent amounts, i.e., about one acid group per epoxide group. The preparation of vinyl ester resins, catalysts for the reaction and other preparation particulars are described in numerous patents. Typical of those patents in U.S. Pat. No. 3,377,406 which describes certain onium catalysts which may be used to prepared vinyl ester resins and which have an extensive disclosure as to types of polyepoxides, unsaturated acids and other ingredients that might be used. Other patents which illustrate the state of the vinyl ester art are U.S. Pat. Nos. 3,179,623; 3,301,743; 3,256,226 and 4,117,030. That latter patent describes vinyl ester resin compositions containing dicyclopentadienyl alkenoates.

Unsaturated polyester resins have been known for decades and typically are the reaction products of polyols, usually diols, with an unsaturated polycarboxylic acid, usually dicarboxylic acid. By adjusting the ratios of polyol and acid the polyester will have a terminal hydroxyl or carboxyl group or those groups can be capped by esterification or other known reaction. Procedures for preparing unsaturated polyesters are well known.

Vinyl ester resins and unsaturated polyesters are frequently liquids that are so viscous as to be difficult to employ in conventional fabrication procedures for plastic articles such as those made from reinforced plastics made by filament winding, lamination, hand layup and other means. To alleviate that viscosity problem and for other reasons, it is commonplace to employ less viscous monomers, such as styrene or the alkyl acrylates, as a reactive diluent. In that capacity the esters of this invention have good reactivity with the resin, have low volatility and do not provide any significant reduction in the characterizing properties of the resin. In fact, the esters through their halogen content contribute some fire retardancy to the resinous product. The halogens of the esters are less rigidly held than aromatic halogens, as, for example, those in tetrabromobisphenol A, or the less easily dehydrohalogenated aliphatics, such as in dibromoneopentyl glycol.

An additional benefit of the compounds and compositions of the invention is their resistance to pyrolytic depolymerization. A serious problem with most plastic materials is their propensity to melt and drip globules of hot molten material. In the present invention, such depolymerization is inhibited by the structure of the halogen substituted dicyclopentadienyl group. Off-gas analysis of these compounds and compositions under pyrolysis show that only one-half of the total halogen content is collectable. It is believed that the halogen substituent at either the 3 or 4 position is removed as hydrogen bromide and the polymer crosslinked through the radical resulting from that removal. Although that theory may not explain the effect completely, the observed result with these compounds and compositions is a lack of depolymerization and its consequences when exposed to pyrolytic conditions that would depolymerize other polymers.

The monoester can be converted into a vinyl ester resin by reaction of the free carboxyl group with a mono- or polyglycidyl ether or into an unsaturated polyester by reaction with a polyhydroxy compound such as an alkylene diol or a hydroxy terminated polyester.

The invention will be more apparent from the following illustrative examples wherein all parts and percentages are by weight.

EXAMPLE 1

Into a 1 liter glass vessel equipped with a Dean Stark collector and nitrogen purge, 300 grams (2 moles) of dicyclopentadienyl alcohol (DCPD-OH), 116 grams (1 mole) of fumaric acid, 0.1 percent of dibutyl tin oxide catalyst and 750 ppm hydroquinone inhibitor are added. The reaction temperature was raised slowly to 175° C. and water of condensation was collected. In about eight hours the acid number had dropped to less than 20. The reaction mixture was cooled to about 50° C. and ethylene dichloride (EDC) was added to create a 33 percent solids solution. To the solution 320 grams (2 moles) of bromine was added over a two-hour period maintaining a 15°–25° C. reaction temperature and a slight nitrogen sweep. After water washing the EDC was stripped off and a pale yellow solid product was collected having a 75° C. Durran's softening point and 45.5 percent Br content. The above solid was placed in styrene to create a clear solution of 20 percent styrene and a viscosity of 400 cks.

EXAMPLE 2

150 Grams (1 eq.) of DCPD-OH and 98 grams (2 eq.) of maleic anhydride were reacted for five hours at 120° C. to give the resultant half ester. The half ester was taken up as 33 percent solids in EDC and to the solution 160 (2 eq.) of bromine was added dropwise not allowing the exotherm to go over 30° C. Bromination was essentially complete in about one hour addition and two hours of digestion time at ambient temperature. The resultant stripped product was a low melting point amber solid. To this brominated half ester 180 grams (1 eq.) of diglycidyl ether of Bisphenol A (DER ® 331) was added. The mixture also contained 20 ppm hydroquinone inhibitor and it was reacted down to an acid number of 10 at 115°–120° C. Styrene monomer equivalent to 40 percent by weight was added, resulting in an unsaturated polyester resin of 300 cps viscosity and 16.7 percent Br content.

EXAMPLE 3

Into a 1 liter flask equipped with a stirrer, a thermometer and nitrogen purge, 276 grams (2 eq.) of 95 percent pure DCPD, 116 grams (2 eq.) of maleic acid and 0.3 gram (750 ppm) of hydroquinone inhibitor was added. The mixture is heated to 120° C. at which time 0.4 gram (0.1 percent) of boron trifluoride-etherate catalyst was introduced.

The clear mixture was reacted at 130° C. for nine hours until an acid value equilibrium of about 87 was reached. The mixture was washed with hot water and purified to an acid number of 50. This product was identified by high pressure liquid chromatography as being 80 percent diester and identical to the chromatogram of Example 1, and 20 percent half ester and identical to the chromatogram of Example II.

EXAMPLE 4

The brominated fumarate diester produced in Example 1 was mixed in with a general purpose polyester resin solid commercially as CORRES 1259-1-33, at various bromine levels and the results are shown in Table I.

EXAMPLE 5

The brominated fumarate diester produced in Example 1 was mixed in with a brominated vinyl ester resin sold commercially as Derakane ® 510-A40 (40 percent styrene) and a nonbrominated vinyl ester resin sold commercially as Derakane ® 470-36 (36 percent styrene) and the results are tabulated in Table II. Also, the resin produced in Example 2 was included for comparison.

EXAMPLE 6

Into a three-necked ½ liter flask equipped with a stirrer, a thermometer and reflux condenser, 66.7 grams (0.64 mole) of styrene monomer and 33.3 grams (0.05 mole) of brominated dicyclopentadiene fumarate monomer of Example 1 were placed. To the solution 0.2 percent 2,2'-azobis(isobutyronitrile)-Vazo 64-initiator was added along with toluene solvent to give a 60 percent solids mixture. The reaction was run at 80° C. for 70 hours until a constant Gardner viscosity was obtained. The copolymer was placed into a vacuum oven and the solvent plus unreacted styrene was flashed off at 180° C.

Molecular weight analysis of the resultant copolymer compared to polystyrene standards exhibited an $M_w$ of 88,000 and a bromine content of 18.7 percent. A casting of ⅛" thickness was molded via a heated platten press. A Limited Oxygen Index (LOI)* of 32, measured according to ASTM D 2863-77, exhibiting considerable char formation at the ignition tip, was found in samples cut from the castings.

*LOI—rating is not intended to reflect hazards presented by this or any other material under actual fire conditions.

TABLE I

BROMINATED DICYCLOPENTADIENE FUMARATE AS ADDITIVE IN POLYESTER RESINS
⅛" Clear Cast Properties, 16 Hours @ Room Temperature, 2 Hours Post Cure @ 311° F.

| Resin Composition | Heat Distortion Temp. (HDT) | Tensile Strength | % Elong. | Flexural Strength | Flexural Modulus | LOI | UL 94 Vertical | 24 Hours Toluene Absorp. | Water Absorp. |
|---|---|---|---|---|---|---|---|---|---|
| CORRES 1259-1-33 | 160° F. | 3,900 (psi) | 0.6 | 10,000 (psi) | $6.1 \times 10^{-5}$ (psi) | — | — | 0.1% | 0.3% |

TABLE I-continued

BROMINATED DICYCLOPENTADIENE FUMARATE AS ADDITIVE IN POLYESTER RESINS
⅛" Clear Cast Properties, 16 Hours @ Room Temperature, 2 Hours Post Cure @ 311° F.

| Resin Composition | Heat Distortion Temp. (HDT) | Tensile Strength | % Elong. | Flexural Strength | Flexural Modulus | LOI | UL 94 Vertical | 24 Hours Toluene Absorp. | 24 Hours Water Absorp. |
|---|---|---|---|---|---|---|---|---|---|
| Resin + 15% Br Additive (Ex. 1) | 171° F. | 3,000 | 0.6 | 8,500 | $5.8 \times 10^{-5}$ | 27 | V-O | 0.3% | 0.2% |
| Resin + 20% Br Additive (Ex. 1) | 170° F. | ←Too Brittle→ | | | | 34 | 5V | 1.5% | 0.2% |

TABLE II

BROMINATED DICYCLOPENTADIENE FUMARATE AS ADDITIVE IN VINYL ESTER RESINS

| Resin Composition | HDT | Flexural Strength psi | Flexural Modulus, psi | LOI | UL 94 Vertical | 24 Hours Toluene Absorp. % |
|---|---|---|---|---|---|---|
| Derakane ® 470-36 | 291° F. | 18,000 | $5 \times 10^{-5}$ | — | — | .03 |
| Derakane ® 470-36 + 10% Br Additive (Ex. 1) | 270° F. | 19,000 | $6 \times 10^{-5}$ | 27 | V-O | .01 |
| Derakane ® 510-A-40 | 226° F. | 20,000 | $5 \times 10^{-5}$ | 27 | V-O | 1.04 |
| Derakane ® 510-A-40 + 4% Br Additive (Ex. 1) | 223° F. | 25,000 | $6 \times 10^{-5}$ | 43 | 5V | 1.23 |
| Example 2 | 210° F. | 13,000 | $6 \times 10^{-5}$ | 29 | V-O | 0.10 |

What is claimed is:

1. A curable resinous composition comprising (1) a vinyl ester resin which is the reaction product: of essentially equivalent amounts of a polyepoxide and a monoethylenically unsaturated carboxylic acid, and
 (2) a reactive diluent consisting essentially of a dicyclopentadienyl monoester or diester of fumaric acid wherein said dicyclopentadienyl ester group contains one or two halogen atoms.

2. The composition of claim 1 wherein said vinyl ester resin is the dimethacrylate of the diglycidyl ether of bisphenol-A.

3. The composition of claim 1 wherein said dicyclopentadienyl monoester and diester is a reactive diluent present in said composition in an amount of from about 30 to 60 weight percent based on the combined weight of resin and diluent.

* * * * *